United States Patent
Williams et al.

(10) Patent No.: US 12,169,746 B2
(45) Date of Patent: Dec. 17, 2024

(54) HIGH-SPEED PRINTER VIDEO INTERFACE USING A HIGH-DEFINITION MEDIA INTERFACE (HDMI)

(71) Applicant: Fiery, LLC, Fremont, CA (US)

(72) Inventors: Leon Calvin Williams, Foster City, CA (US); Patrick H. Wood, Lake Hopatcong, NJ (US)

(73) Assignee: FIERY, LLC, Fremont, CA (US)

( * ) Notice: Subject to any disclaimer, the term of this patent is extended or adjusted under 35 U.S.C. 154(b) by 0 days.

(21) Appl. No.: 18/155,307

(22) Filed: Jan. 17, 2023

(65) Prior Publication Data
US 2024/0242049 A1    Jul. 18, 2024

(51) Int. Cl.
*G06K 15/00*    (2006.01)
*G06K 15/02*    (2006.01)

(52) U.S. Cl.
CPC ....... *G06K 15/4045* (2013.01); *G06K 15/181* (2013.01)

(58) Field of Classification Search
USPC .......................................................... 358/1.2
See application file for complete search history.

(56) References Cited

U.S. PATENT DOCUMENTS

| | | | |
|---|---|---|---|
| 6,411,302 B1 * | 6/2002 | Chiraz | G09G 5/024 |
| | | | 345/545 |
| 9,280,506 B1 | 3/2016 | Mohanty et al. | |
| 9,766,847 B1 | 9/2017 | Alacar | |
| 10,747,487 B2 * | 8/2020 | Bermundo | G06F 3/1298 |
| 2008/0144140 A1 | 6/2008 | Eldridge et al. | |
| 2015/0043653 A1 | 2/2015 | Ying et al. | |
| 2018/0343324 A1 * | 11/2018 | Zhu | H04L 69/18 |
| 2019/0377957 A1 * | 12/2019 | Johnston | G06V 20/41 |
| 2021/0314647 A1 | 10/2021 | Mallett | |

FOREIGN PATENT DOCUMENTS

| | | |
|---|---|---|
| CN | 111258511 A | 6/2020 |
| GB | 2441826 A | 3/2008 |
| GB | 2474792 A | 4/2011 |
| JP | 2013208730 A | 10/2013 |
| JP | 6508616 B2 | 4/2019 |

* cited by examiner

*Primary Examiner* — Jacky X Zheng
(74) *Attorney, Agent, or Firm* — Perkins Coie LLP

(57) ABSTRACT

A system uses GPU accessible, high-speed memory to store compressed or raw video printer data. The system transmits this video data over one or more frames of an HDMI interface and a circuit reconstructs the video data for a page from one or more HDMI frames for communication to a printer.

4 Claims, 6 Drawing Sheets

HIGH-SPEED PRINTER VIDEO INTERFACE USING A HIGH-DEFINITION MEDIA INTERFACE (HDMI)

FIELD

Various of the disclosed embodiments concern a high-speed printer video interface using a High-Definition Media Interface (HDMI).

BACKGROUND

Some digital printing solutions, such as those marketed by Fiery, currently use custom ASICs to transmit raster data to printers at high speeds. Fiery's custom "VX" ASICs contain proprietary decompression and common image processing operators, such as halftoning and tone curves, to transmit raster data to the printers at high speeds. The bandwidth required to deliver raster data in real-time to many printers can exceed a typical computer's capabilities. For example, a 120 letter-sized page per minute (PPM) color printer at 1200 dpi requires approximately 1 Gbyte per second of raster data. Meeting these real time bandwidth requirements is impractical even using 10 Gb Ethernet and typical memory systems even before accounting for the image processing operators.

Modern GPU video boards with HDMI interfaces provide the required memory speeds, processing capabilities, and video transmission in commercially available hardware without the costs of designing new hardware. Additionally, as the number of units per year declines, amortizing the NRE costs of customer ASICs has become uneconomical. A memory interface between a GPU and its directly connected memory can achieve 1000 GBytes/second bandwidth. Video connections conforming to the HDMI 2.1a specification can support 48 Gbits/second or 6 GBytes/sec which is sufficient for most of the high-speed printers driven by digital printing solutions such as those marketed by Fiery.

SUMMARY

Embodiments of the invention use multiple video frames in HDMI to represent a single page on a printer. In typical HDMI usage, the interface transmits a standard frame size, e.g. 4K UHD, multiple times a second to represent motion. In embodiments of the invention, a page which has more pixels than a typical video display is broken up into multiple frames. These frames are transmitted over the HDMI transmitter and the pages are reconstructed from the output of the HDMI receiver.

In embodiments, a system uses GPU accessible, high-speed memory to store compressed or raw video printer data. The system transmits this video data over one or more frames of an HDMI interface and a circuit reconstructs the video data for a page from one or more HDMI frames for communication to a printer.

DETAILED DESCRIPTION

Figure 1:
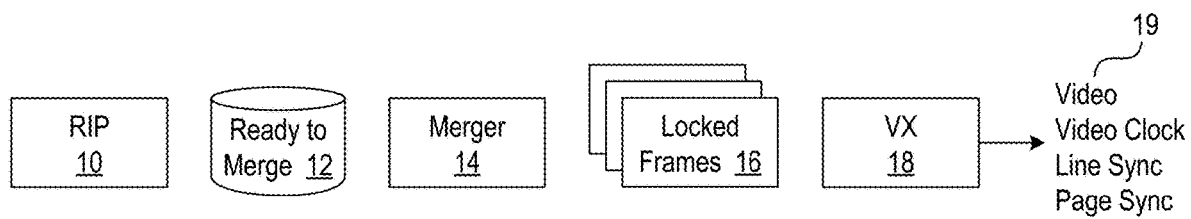
FIG. 1 is a block diagram showing a current state-of-the-art high-speed printer video system.

FIG. 1 is a block diagram showing a state-of-the-art high-speed printer video system in which encoded raster data delivered from the raster image processor ("RIP") 10 is collected into a ready to merge video format 12. This format is used to enable variable data applications that require data common to many pages, such as a slide background or company logo, to be merged 14 with page unique data. The ready to merge data format can be raw pixels or an encoded/compressed format such as run-length compressed pixel data. The merger takes pixel page data for a page element, i.e. a previous RIPed and encoded page component, and merges it with the current page data to form the complete, composite page. The current page delivered from the RIP contains instructions defining which elements are to be placed, where they are to be placed, and any transformation (rotation and/or scale) to be applied in the merge placement.

Once all data for a page has been merged, the data is placed into locked frames 16. These pages (or frames) must be delivered in real-time on demand. The number of locked frames depends on the specific printer architecture such as the number of pages on a belt or drum. In Fiery printers these pages are then delivered as required to a proprietary VX ASIC 18 for transmission to the printer 19. The VX ASIC synchronizes the pixel delivery to the printer based on timing signals such as page sync, line sync, and pixel clock signals from the printer. It can also decompress pixel data in the ready to merge format, if required, and potentially applies any real time processing such as tone curve adjustment and halftoning. The entire page is delivered in real time to match the physical pixel printing process including laser/head position, drum/belt/media position, and any interline delay timing.

Figure 2:
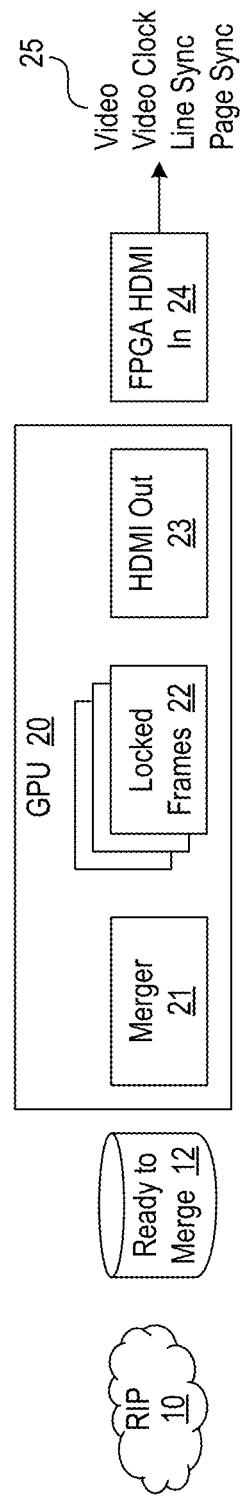
FIG. 2 is a block diagram showing high-speed printer video interface a using high-definition media interface (HDMI) according to an embodiment of the invention.

FIG. 2 is a block diagram showing high-speed printer video interface a using high-definition media interface (HDMI) according to an embodiment of the invention. Embodiments of the invention use multiple frames in HDMI to represent a single page on a printer. In typical HDMI usage, the interface transmits a standard frame size, e.g. 4K UHD, multiple times a second to represent motion. This done to mimic a standard HDMI video transmission such that the HDMI interface operates as though it is receiving standard video frames. In this way, the HDMI interface conforms to the HDMI standard and need not be modified.

The standard negotiation between HDMI transmitter and HDMI receiver is first performed so that both the transmitter and the receiver agree on the frame dimensions and pixel component depth (bits). The choice of frame dimensions and pixel depth are determined prior to printing based on printer page size, data rate, and the HDMI capabilities inherent to the specific GPU card being used. This choice is made by higher-level control software and used to program both the GPU and the FPGA to the suitable HDMI frame format. In embodiments of the invention, a page which has more pixels than a typical video display is broken up into multiple frames. Each frame represents a band of the full page where a band is a partial page, for example a fixed number of printer page scan lines whose data size fits into the previously negotiated frame size. These frames are transmitted over the HDMI transmitter and the pages are reconstructed from the output of the HDMI receiver. The reconstruction can be as simple as appending the data from each successive frame and synchronizing the transmission to the printer according to the page sync, line sync, and video clock. Additional processing steps are possible, as in the VX ASIC, to perform real time correction and processing to the video prior to transmission to the printer.

There are additional optimizations and complexity which can be taken advantage of, if needed. For example, a color palate could represent simple color pages and the pixel data could be an index into this palate as with GIF files. Data could be run-length encoded in the GPU with the FPGA doing decoding. Also, technologies such as Nvidia "Gsync" allow a partial frame to be sent and then restarted. This would enables variable size frames that would result from sending compressed data to be optimized.

Figure 3:
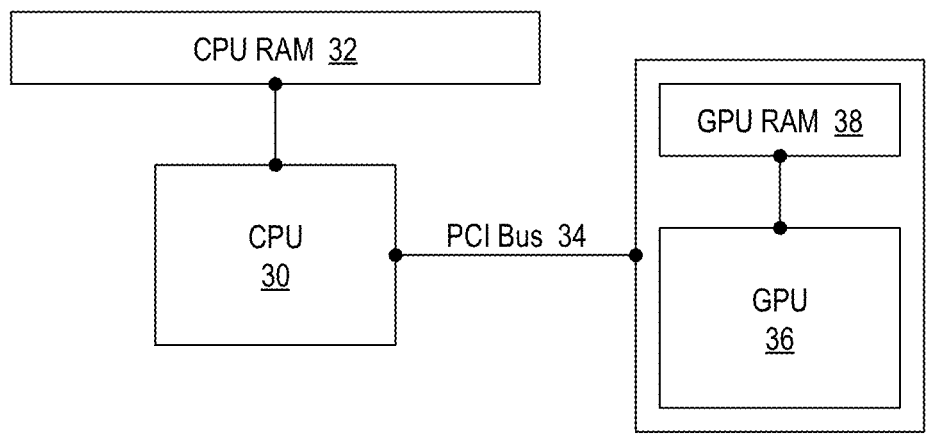
FIG. 3 is a block diagram showing the use of a GPU accessible, high-speed memory to store compressed or raw video printer data according to an embodiment of the invention.

In embodiments, a system uses GPU accessible, high-speed memory to store compressed or raw video printer data. FIG. 3 is a block diagram showing the use of a GPU accessible, high-speed memory to store compressed or raw video printer data according to an embodiment of the invention. As seen in FIG. 3, the GPU 36 memory (GPU RAM 38) is separate from system CPU 30 memory (CPU RAM 32). GPU memory is typically much higher bandwidth than CPU memory. Communication between the CPU and GPU occurs via PCI bus 34. Because the HDMI port reads from GPU memory, frame data can be transmitted without loading or constraining the CPU memory or communication between the CPU and GPU to real-time performance.

The system transmits this video data over one or more frames of an HDMI interface and a circuit reconstructs the video data for a physical page, page media, etc., which denotes the final pixel being drawn, from one or more HDMI frames for communication to a printer. In embodiments, files other than those containing printer data could be broken into HDMI frames as taught herein and then reconstructed at a destination. For example, a large database could be broken into HDMI frames and transmitted to a destination. This would take advantage of the enhanced bandwidth offered by the invention when moving large quantities of data.

In embodiments of the invention, the functions of the merger and locked frames are moved into a graphics processing unit ("GPU") enabled video board 20. This is accomplished by modifying the memory allocation control software to allocate frame data from the GPU system. This is typically done through a GPU programming API/environment such as OpenGL, OpenCL, Cuda, Vulkan, Metal, or DirectX.

The GPU performs the merge operation 21 on video stored in the high bandwidth GPU memory. The locked frames 22 are then delivered as required to the HDMI interface which transmits the video in the GPU memory via the HDMI port 23. In embodiments, an FPGA 24 conforms the video data received from the HDMI port to common printer interfaces.

Figure 4:
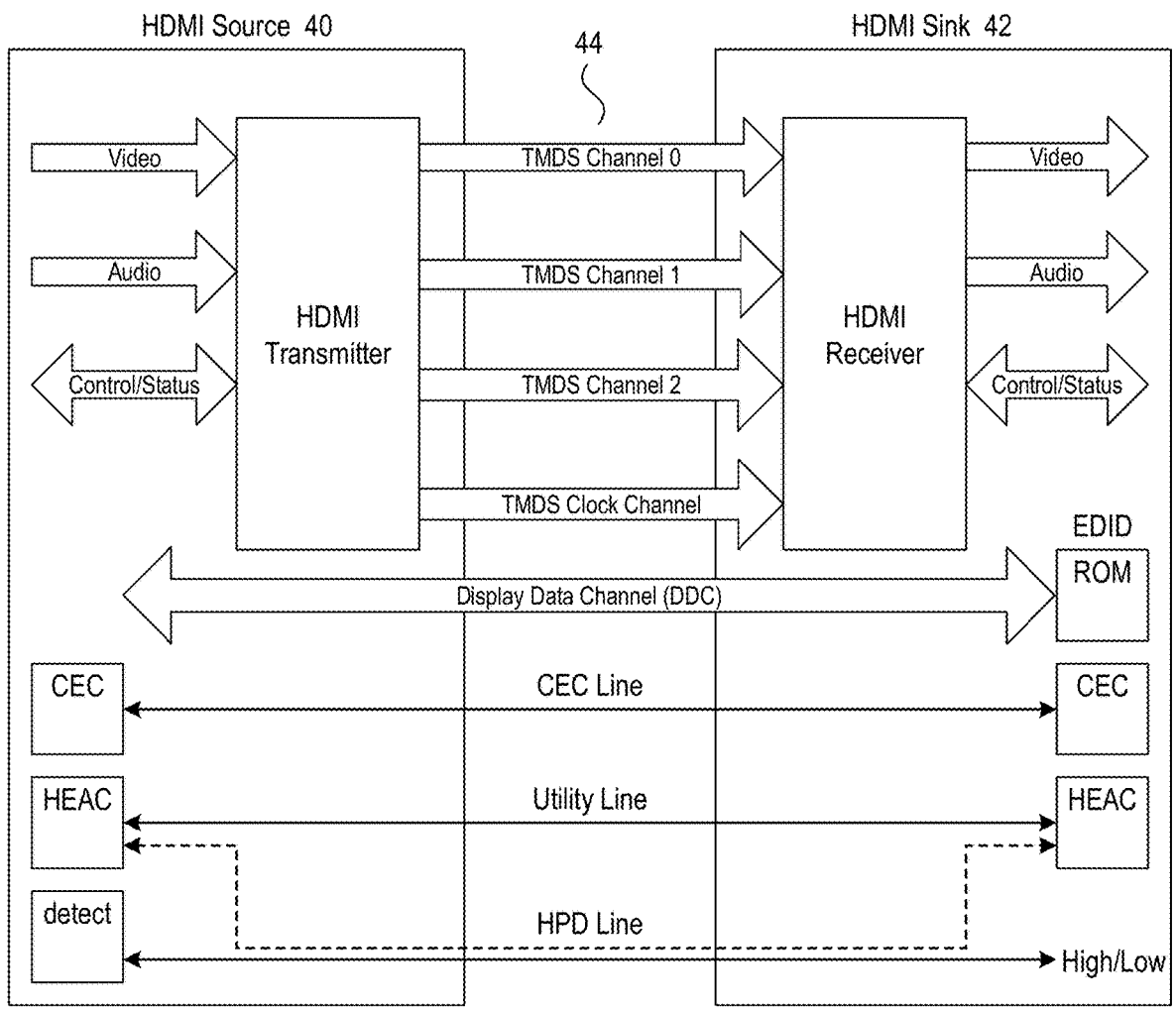
FIG. 4 is an HDMI interface diagram showing signal paths between an HDMI source/transmitter, which in an embodiment of the invention comprises a GPU, and a HDMI sink/receiver, which in embodiments of the invention comprises an FPGA.

FIG. 4 is an HDMI interface diagram showing signal paths between an HDMI source/transmitter 40, which in an embodiment of the invention comprises the GPU, and a HDMI sink/receiver 42, which in embodiments of the invention comprises the FPGA. In the HDMI interface of FIG. 4 video data is carried by the transition-minimized differential signaling (TMDS) signal paths 44.

Figure 5:
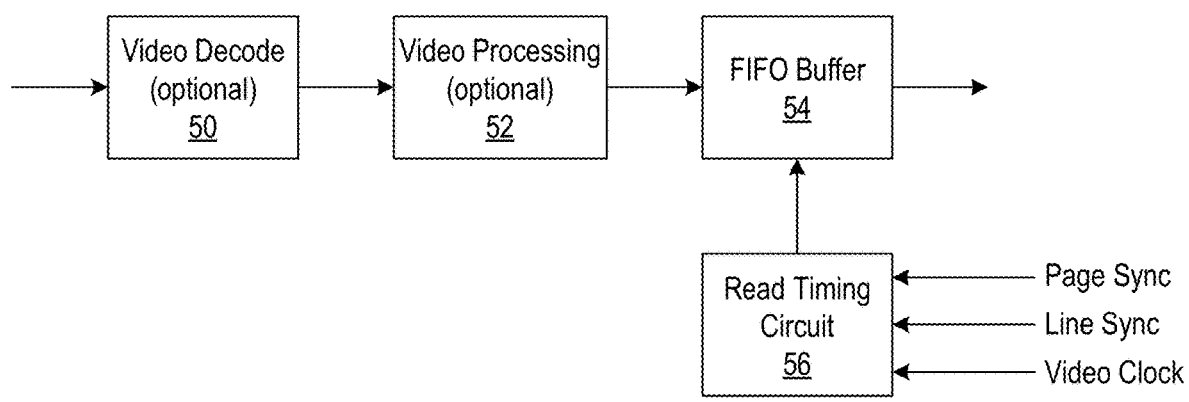
FIG. 5 is a block schematic diagram showing a signal and processing path once video data is received in the FPGA from the HDMI receiver.

FIG. 5 is a block schematic diagram showing a signal and processing path once video data is received in the FPGA from the HDMI receiver. As shown in FIG. 5, the video data is optionally decoded 50, optionally processed 52, and re-syncronized for transmission over the printer interface in accordance with the page sync, line sync, and video clock signals. This synchronization can be accomplished, for example, using a FIFO buffer 54 and a timing circuit 56 to read video from the FIFO buffer to the printer in accordance with the printer's specifications.

Processing System

Figure 6:
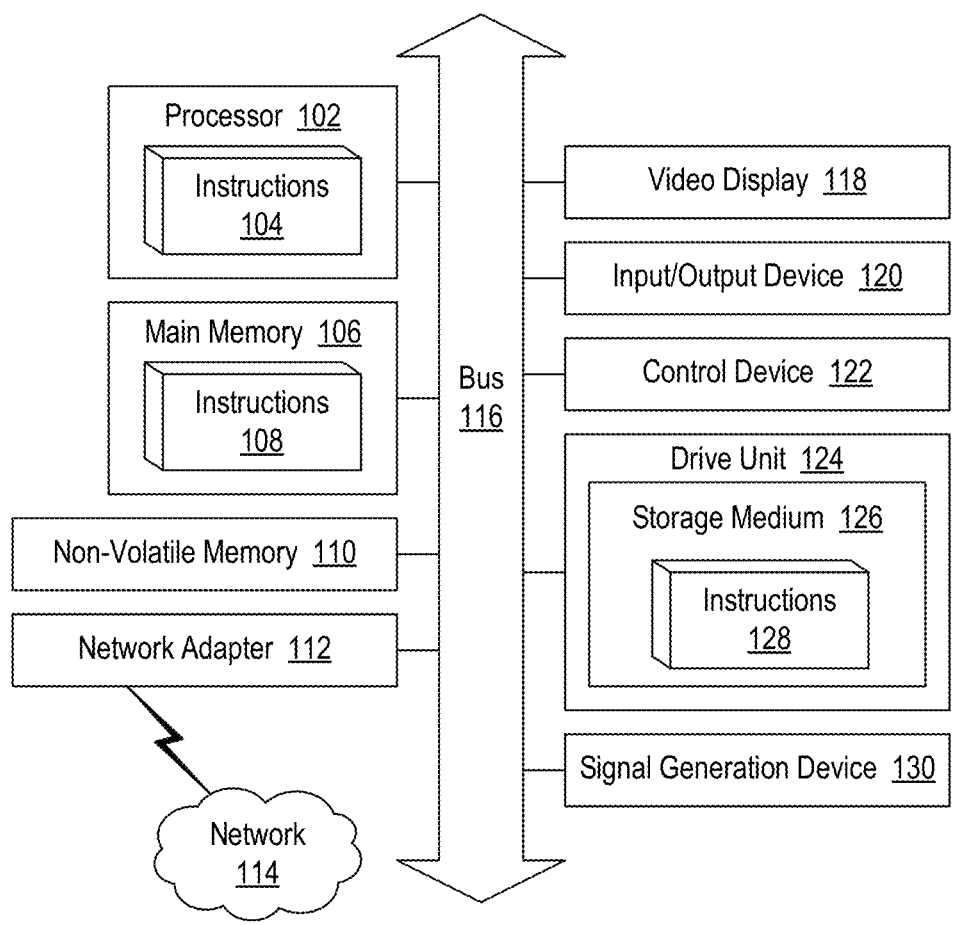
FIG. 6 is a block diagram illustrating an example of a processing system in which at least some operations described herein can be implemented.

FIG. 6 is a block diagram illustrating an example of a processing system 100 in which at least some operations described herein can be implemented. For example, components of the processing system 100 may be hosted on a computing device that includes a threat detection platform. As another example, components of the processing system 100 may be hosted on a computing device that is queried by a threat detection platform to acquire emails, data, etc.

The processing system 100 may include a central processing unit (also referred to as a "processor") 102, main memory 106, non-volatile memory 110, network adapter 112, e.g. a network interface, video display 118, input/output device 120, control device 122, e.g. a keyboard or pointing device, drive unit 124 including a storage medium 126, and signal generation device 130 that are communicatively connected to a bus 116. The bus 116 is illustrated as an abstraction that represents one or more physical buses or point-to-point connections that are connected by appropriate bridges, adapters, or controllers. The bus 116, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), inter-integrated circuit (I2C) bus, or an Institute of Electrical and Electronics Engineers (IEEE) standard 1394 bus (also referred to as "Firewire").

The processing system 100 may share a similar processor architecture as that of a desktop computer, tablet computer, mobile phone, game console, music player, wearable electronic device, e.g. a watch or fitness tracker, network-connected ("smart") device, e.g. a television or home assistant device, virtual/augmented reality systems, e.g. a head-mounted display, or another electronic device capable of executing a set of instructions (sequential or otherwise) that specify actions to be taken by the processing system 100.

While the main memory 106, non-volatile memory 110, and storage medium 126 are shown to be a single medium, the terms "machine-readable medium" and "storage medium" should be taken to include a single medium or multiple media, e.g. a centralized/distributed database and/or associated caches and servers, that store one or more sets of instructions 128. The terms "machine-readable medium" and "storage medium" shall also be taken to include any medium that is capable of storing, encoding, or carrying a set of instructions for execution by the processing system 100.

In general, the routines executed to implement the embodiments of the disclosure may be implemented as part of an operating system or a specific application, component, program, object, module, or sequence of instructions (collectively referred to as "computer programs"). The computer programs typically comprise one or more instructions, e.g. instructions 104, 108, 128, set at various times in various memory and storage devices in an electronic device. When read and executed by the processors 102, the instructions cause the processing system 100 to perform operations to execute elements involving the various aspects of the present disclosure.

Moreover, while embodiments have been described in the context of fully functioning electronic devices, those skilled in the art will appreciate that some aspects of the technology are capable of being distributed as a program product in a variety of forms. The present disclosure applies regardless of the particular type of machine- or computer-readable media used to effect distribution.

Further examples of machine- and computer-readable media include recordable-type media, such as volatile and non-volatile memory devices 110, removable disks, hard disk drives, and optical disks, e.g. Compact Disk Read-Only Memory (CD-ROMS) and Digital Versatile Disks (DVDs), and transmission-type media, such as digital and analog communication links.

The network adapter 112 enables the processing system 100 to mediate data in a network 114 with an entity that is external to the processing system 100 through any communication protocol supported by the processing system 100 and the external entity. The network adapter 112 can include a network adaptor card, a wireless network interface card, a router, an access point, a wireless router, a switch, a multi-layer switch, a protocol converter, a gateway, a bridge, a bridge router, a hub, a digital media receiver, a repeater, or any combination thereof.

The network adapter 112 may include a firewall that governs and/or manages permission to access/proxy data in a network. The firewall may also track varying levels of trust between different machines and/or applications. The firewall can be any number of modules having any combination of hardware, firmware, or software components able to enforce a predetermined set of access rights between a set of machines and applications, machines and machines, or applications and applications, e.g. to regulate the flow of traffic and resource sharing between these entities. The firewall may additionally manage and/or have access to an access control list that details permissions including the access and operation rights of an object by an individual, a machine, or an application, and the circumstances under which the permission rights stand.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

The invention claimed is:

1. A method, comprising:
using GPU accessible, high-speed memory to store compressed or raw video printer data;
transmitting said video data over one or more frames of an HDMI interface;
said HDMI interface any of:
transmitting a standard frame size multiple times a second to represent a full page print image; and
using multiple HDMI frames to represent a single page on a printer;
and
reconstructing the video data for a page from said one or more HDMI frames for communication to a printer.

2. The method of claim 1, further comprising:
breaking up a page that has more pixels than a standard video display into n multiple frames.

3. A printer interface, comprising:
a GPU accessible, high-speed memory configured to store compressed or raw video printer data;
an HDMI transmitter configured to transmit said video data over one or more frames of an HDMI interface;
wherein any of:
said HDMI transmitter transmits a standard frame size multiple times a second to represent motion; and
multiple HDMI frames represent a single page on a printer; and
an HDMI receiver configured to reconstruct the video data for a page from said one or more HDMI frames for communication to a printer.

4. The printer interface of claim 3, wherein a page that has more pixels than a standard video display is broken up into multiple frames.

* * * * *